US012795283B2

(12) United States Patent
Narampanawe et al.

(10) Patent No.: US 12,795,283 B2
(45) Date of Patent: Nov. 10, 2026

(54) METHOD FOR OPERATING AN INDUCTIVE CHARGING DEVICE OF A HEARING INSTRUMENT AND INDUCTIVE CHARGING DEVICE OF A HEARING INSTRUMENT

(71) Applicant: Sivantos Pte. Ltd., Singapore (SG)

(72) Inventors: Nishshanka Bandara Narampanawe, Singapore (SG); Chuan En Andrew Ong, Singapore (SG); Koen J. Weijand, L'Alfàs del Pi (ES)

(73) Assignee: Sivantos Ltd., Singapore (SG)

( * ) Notice: Subject to any disclaimer, the term of this patent is extended or adjusted under 35 U.S.C. 154(b) by 228 days.

(21) Appl. No.: 18/785,182

(22) Filed: Jul. 26, 2024

(65) Prior Publication Data

US 2025/0039593 A1 Jan. 30, 2025

(30) Foreign Application Priority Data

Jul. 28, 2023 (DE) ..................... 10 2023 207 237.8

(51) Int. Cl.
*H04R 25/00* (2006.01)
*H02J 50/12* (2016.01)
*H04R 1/1025* (2026.01)

(52) U.S. Cl.
CPC ............ *H04R 1/1025* (2013.01); *H02J 50/12* (2016.02)

(58) Field of Classification Search
CPC .. H04R 1/1025; H04R 2225/31; H04R 25/30; H04R 25/00; H02J 50/10; H02J 50/12
USPC .......................................................... 381/312
See application file for complete search history.

(56) References Cited

U.S. PATENT DOCUMENTS

2012/0267960 A1 10/2012 Low et al.
2015/0207330 A1 7/2015 Petersen
2021/0243532 A1 8/2021 Backus et al.
2024/0259738 A1 * 8/2024 Narampanawe ........ H02J 50/10

FOREIGN PATENT DOCUMENTS

DE 102024123095 A1 * 6/2025 .............. H02J 7/971

* cited by examiner

*Primary Examiner* — Phylesha Dabney
(74) *Attorney, Agent, or Firm* — Laurence A. Greenberg; Werner H. Stemer; Ralph E Locher

(57) ABSTRACT

A method for operating an inductive charging device of a hearing instrument. The charging device includes a voltage source and an oscillating circuit connected thereto, a charging coil and a capacitance. The capacitance has a main capacitor and an adjustment branch connected in parallel therewith. For different states of the adjustment branch, which differ from one another on the basis of the capacitance of the adjustment branch, a value that denotes an electrical current resulting from the charging coil is recorded. That state in which the electrical current corresponding to the value is at a maximum is determined, and the adjustment branch is set to correspond to the state. There is also described an inductive charging device and a corresponding system.

10 Claims, 2 Drawing Sheets

METHOD FOR OPERATING AN INDUCTIVE CHARGING DEVICE OF A HEARING INSTRUMENT AND INDUCTIVE CHARGING DEVICE OF A HEARING INSTRUMENT

FIELD AND BACKGROUND OF THE INVENTION

The invention relates to a method for operating an inductive charging device of a hearing instrument and to an inductive charging device of a hearing instrument. The inductive charging device has a voltage source and an oscillating circuit connected thereto. The invention furthermore relates to a system having an inductive charging device and a hearing instrument.

People who suffer from a hearing impairment normally use a hearing aid, which is a hearing instrument. Here, an ambient sound is converted into an electrical (audio/sound) signal usually by means of a microphone, that is to say an electromechanical sound converter, so that the electrical signal is detected. The detected electrical signals are processed by means of an amplifier circuit and introduced into the auditory canal of the person by means of a further electromechanical converter in the form of a receiver. In addition, the detected sound signals are usually processed, for which purpose a signal processor of the amplifier circuit is normally used. The amplification is adapted to any hearing loss the hearing-aid wearer may have. The (sound) converter and the amplifier circuit are arranged in a housing and in this way are at least partially protected from environmental influences.

To power the individual components of the hearing aid, such as the amplifier circuit and the sound converter, a battery is generally used. This battery is configured as a replaceable secondary battery, for example, which can be removed from the housing and charged outside the housing. As a consequence, the housing must be of a minimum size so that it is possible to remove the battery manually. If the size of the housing is reduced further, such a removal is no longer possible. In this case, the battery is installed permanently and is charged inside the housing. In order to minimize the number of openings in the housing through which foreign particles, for example, can enter the housing, a charging unit is increasingly being provided in the housing, which charging unit has a receiving coil. This receiving coil is inductively energized by means of an external charging device in order to charge the battery, such that the battery and thus the hearing aid are charged wirelessly.

The charging device normally has an oscillating circuit that is connected to a voltage source. Energizing of the oscillating circuit takes place by means of this voltage source during operation, so that an alternating current is fed through it. Consequently, a temporally variable magnetic field is formed, which induces an alternating current in the receiving coil, which alternating current is used to charge the battery. To ensure that the amount of energy transferred between the charging device and the hearing instrument is as large as possible, with a charging process being comparatively short and losses being as low as possible, the frequency of the magnetic field created must be identical to the natural frequency of the oscillating circuit of the charging device and identical to the natural frequency of a further oscillating circuit, which is partially formed by means of the receiving coil, of the charging unit.

The natural frequency of the oscillating circuit of the charging device is predefined on the basis of the inductance of a charging coil of the oscillating circuit and the capacitance of a capacitor of the oscillating circuit. Owing to manufacturing tolerances in these components, however, it is possible for the natural frequency of the oscillating circuit to shift. If the shift is comparatively large, the amount of energy absorbed by the hearing instrument is comparatively small, and therefore the charging device substantially cannot be used to charge the hearing instrument.

To help with this, it is for example possible to select components with comparatively low manufacturing tolerances, although this increases production costs. Alternatively, after each charging device is manufactured, the natural frequency of the respective oscillating circuit is determined and compared with the desired natural frequency. If the deviation is too great, the charging device is rejected and not used further, for example. As an alternative to this, for example, the capacitor is removed and replaced with another one. In an alternative, a further capacitor is installed which is electrically connected in series or in parallel with the capacitor, so that the natural frequency is shifted. In both variants, an additional assembly step, that is to say a mechanical modification to the already created charging device, is required, which also increases production costs. In the newly assembled capacitor, it is also possible for it to have an unfavorable capacitance owing to manufacturing tolerances, which means that renewed post-processing is required.

SUMMARY OF THE INVENTION

The object of the invention is to specify a particularly suitable method for operating an inductive charging device of a hearing instrument and a particularly suitable inductive charging device of a hearing instrument and a particularly suitable system having an inductive charging device and a hearing instrument, wherein electrical losses occurring are reduced in particular, and wherein production costs are expediently reduced and preferably efficiency is increased.

Regarding the method, this object is achieved by the method as claimed, regarding the inductive charging device it is achieved by the device as claimed and regarding the system it is achieved by the system as claimed. Advantageous developments and configurations are the subject matter of the respective dependent claims.

The method is used to operate an inductive charging device of a hearing instrument. The inductive charging device, which is also referred to hereinbelow simply as a charging device, is not a component part of the hearing instrument, but rather is used to charge the hearing instrument. The charging device is in particular not just suitable, but also provided and designed for this purpose. For example, the charging device has a holder for the hearing instrument, by means of which the hearing instrument is held or can be held temporarily during the charging process. The holder is preferably formed by means of a cradle or a hollow structure into which the hearing instrument can be inserted. After completion of the charging process, the hearing instrument can be removed from the charging device, and in particular they can be used separately.

For example, the hearing instrument is a headphone or comprises a headphone, and the hearing instrument is a headset, for example. Particularly preferably, the hearing instrument is a hearing aid. The hearing aid is used to support a person suffering from a hearing impairment. In other words, the hearing aid is a medical device by means of which partial hearing loss is compensated for, for example. The hearing aid is, for example, a "receiver-in-the-canal" hearing aid (RIC; Ex receiver hearing aid), an "in-the-ear"

hearing aid, an "in-the-canal" hearing aid (ITC) or a "complete-in-canal" hearing aid (CIC), hearing glasses, a pocket hearing aid, a bone conduction hearing aid or an implant. Alternatively, the hearing aid is a "behind-the-ear" hearing aid that is worn behind the auricle.

The hearing instrument is provided and designed to be worn on the human body. In other words, the hearing instrument preferably comprises a holding device which makes it possible to attach it to the human body. Insofar as the hearing instrument is a hearing aid, the hearing instrument is provided and designed to be arranged behind the ear or inside the auditory canal, for example. In particular, the hearing instrument is wireless and provided and designed to be inserted at least partially into an auditory canal.

The hearing instrument comprises a microphone, for example, which is used to capture sound. In particular, during operation, an ambient sound or at least a part thereof is captured by means of the microphone. The microphone is, in particular, an electromechanical sound converter. The microphone has, for example, only a single microphone unit or a plurality of microphone units which interact with one another. Each one of the microphone units expediently has a diaphragm which is made to vibrate by sound waves, wherein the vibrations are converted into an electrical signal by means of an appropriate recording device, such as a magnet that is moved in a coil. It is therefore possible, by means of the respective microphone unit, to detect an audio signal that is based on the sound impinging on the microphone unit. The microphone units are configured to be, in particular, omnidirectional. Expediently, the microphone is arranged at least partially inside a housing of the hearing instrument and thus at least partially protected.

The hearing instrument expediently has a receiver for outputting an output signal. The output signal is in particular an electrical signal. The receiver is an electromechanical sound converter, preferably a loudspeaker. Depending on the configuration of the hearing instrument, in the intended state the receiver is arranged at least partially inside an auditory canal of a wearer of the hearing instrument, that is to say a person, or at least acoustically connected thereto. The hearing instrument is used in particular mainly to output the output signal by means of the receiver, wherein a corresponding sound is generated. In other words, the main function of the hearing instrument is preferably the output of the output signal. The output signal is in particular generated at least partially as a function of the sound captured by means of the microphone.

The hearing instrument expediently comprises a signal processor which, in a suitable manner, forms a signal processing unit or is at least a component part thereof. However, the hearing instrument expediently at least comprises an appropriate signal processing unit. The signal processor is, for example, a digital signal processor (DSP) or produced by means of analog components. The signal processor is used in particular to adapt the (audio) signal generated by means of any microphone, preferably as a function of any hearing loss of a wearer of the hearing instrument. An A/D converter is expediently arranged between the microphone and the signal processing unit, for example the signal processor, provided that the signal processor is configured as a digital signal processor. The signal processor is adjusted in particular as a function of a set of parameters. The set of parameters is used to predefine an amplification in different frequency ranges, so that signal generated by means of the microphone is processed in accordance with certain specifications, in particular as a function of the hearing loss of the wearer of the hearing instrument. Particularly preferably, the hearing instrument additionally comprises an amplifier, or the amplifier is at least partially formed by means of the signal processor. For example, the amplifier is connected upstream or downstream of the signal processor in terms of signal technology.

The hearing instrument preferably comprises a charging unit that is provided in particular for wirelessly charging the hearing instrument, expediently a battery of the hearing instrument. For this purpose, in the assembled state the charging unit is expediently electrically contacted with the battery. The battery is preferably a secondary battery, and/or the battery is used to power any receiver, microphone and/or the signal processing unit. In particular, the battery is substantially used to power all further component parts of the hearing instrument. The charging unit is used in particular for the wireless reception of electrical energy, so that by means of the charging unit, wireless charging of the hearing instrument is possible, in particular so-called "wireless charging". The charging unit preferably interacts with the charging device.

The charging device has a voltage source by means of which an (electrical) voltage, such as a direct voltage or particularly preferably an (electrical) alternating voltage, is provided. In particular, the electrical voltage is below 60 V and is 12 V or 5 V, for example. In addition, the charging device comprises an oscillating circuit connected to the voltage source. It is therefore possible to operate the oscillating circuit by means of the voltage source, for which purpose an electrical current in particular is fed from the voltage source into the oscillating circuit. The oscillating circuit has a charging coil, which is in particular an electrical coil. Consequently, a certain inductance is provided by means of the charging coil. In addition, the oscillating circuit has a capacitance. The oscillating circuit is preferably formed by means of the charging coil and the capacitance.

The capacitance has a main capacitor. Furthermore, the capacitance has an adjustment branch that is electrically connected in parallel with the main capacitor. The adjustment branch is adjustable, and by adjusting the adjustment branch it is possible to alter (the size of) the capacitance of the adjustment branch. A plurality of states is defined, wherein the capacitance of the adjustment branch differs in each state. In particular, at least two different settings are therefore present, which means that the adjustment branch has two corresponding states. Since the adjustment branch is connected in parallel with the main capacitor of the oscillating circuit, the capacitance of the oscillating circuit is therefore also different in different states. As a consequence, it is also possible to alter the natural frequency of the oscillating circuit by adjusting the adjustment branch. In other words, each of the states corresponds to a different natural frequency of the oscillating circuit.

For example, the capacitance is formed only by means of the main capacitor and the adjustment branch. Particularly preferably, however, the capacitance comprises another one or more, preferably two, further capacitors, which are referred to below as secondary capacitors, and which are in particular electrically connected in series with the main capacitor. By means of these, it is in particular possible to increase the capacitance provided. An electrical capacitance of the main capacitor is preferably between 5 nF and 10 nF, and any secondary capacitors have a capacitance between 1 nF and 5 nF, for example. These are preferably configured differently than one another, so that the capacitance of the oscillating circuit can be selected comparatively freely.

According to the method, for different states of the adjustment branch, in particular all states of the adjustment branch, a value is recorded that denotes the electrical current resulting from the altered capacitance through the charging coil. In other words, the voltage source is operated and the value is recorded. The value denotes the electrical current flowing through the charging coil, which electrical current differs on account of the altered capacitance. The current is preferably unambiguously assigned to the respective value. The voltage source is suitably always operated in the same manner during recording of the value, so that the different electrical currents and thus also the different values are produced only on account of the different capacitance in each case.

In a subsequent work step, that state in which the electrical current corresponding to the value is at a maximum is determined. Therefore if, for example, the characteristic value substantially corresponds, or is directly proportional, to the electrical current, the maximum of the values is determined and the state in which this value was recorded. With identical operation of the voltage source, the smaller the deviation of the natural frequency of the oscillating circuit from the frequencies used to operate the oscillating circuit, in particular the frequency of the alternating voltage provided by means of the voltage source, the greater the electrical current.

Following this, the adjustment branch is set to correspond to the state, that is to say the state in which the electrical current corresponding to the value was at a maximum. The oscillating circuit is therefore now set in such a way that, during operation with the voltage source, the electrical current flowing through the charging coil is at a maximum. Comparatively efficient operation of the oscillating circuit, and thus comparatively effective transfer of energy to the hearing instrument, is therefore possible. In other words, owing to the setting of the capacitance, the natural frequency of the oscillating circuit is adapted to the voltage source used, which means that effectiveness in the transfer of energy to the hearing instrument, that is to say charging of the hearing instrument, is maximized and losses are comparatively low. Efficiency is therefore increased.

Owing to the adjustability of the adjustment branch, it is possible to produce comparatively high electrical currents with each charging device, wherein components with a comparatively high manufacturing tolerance can be used in each case for the charging coil and the capacitance of the oscillating circuit, which means that material costs and therefore also production costs are reduced. It is also possible to continue using essentially any charging device, which reduces waste. Mechanical post-processing of the charging device is not necessary, and therefore production costs are also comparatively low.

For example, the electrical current is used as a characteristic value. Particularly preferably, however, the characteristic value used is an electrical voltage that drops in particular across a measurement resistor. In this way, it is possible to use a comparatively inexpensive sensor, which means that production costs are further reduced. The measurement resistor is, in particular, connected to the oscillating circuit and for example in parallel with the main capacitor or a further component part of the oscillating circuit, such as the or one of any secondary capacitors.

For example, the method is carried out upon each use of the charging device, for example when switching on or when starting a powering procedure, that is to say in particular each time it is restarted. In this way, in particular aging effects of the main capacitor and further component parts of the charging device are taken into consideration, which means that the charging device has comparatively good functionality over a long period of time. As an alternative to this, the method is carried out at specific time intervals or when a specific condition is met. Alternatively, the method is carried out only once, for example after or on completion of manufacture of the charging device. Thus, after the mechanical manufacture, the manufacturing tolerances of the components are compensated, and each time a user wishes to use the charging device, it is essentially immediately ready for use. It is also not necessary for a user to carry out a corresponding action, which increases convenience.

For example, the setting of the adjustment branch is performed manually, for example by mechanically actuating a mechanical switch or the like, which is arranged inside a housing of the charging device, for example. Particularly preferably, however, the setting is performed by means of an electronic unit, of the charging device, which therefore reduces outlay, and the setting can also be performed with the housing of the charging device closed.

Expediently, after the setting, a process to charge the hearing instrument is started. Therefore, to charge the hearing instrument, that setting of the oscillating circuit at which the efficiency is at a maximum is used, so that the process of charging the hearing instrument is completed comparatively quickly.

The inductive charging device is suitable, in particular provided and designed, for charging a hearing instrument. The inductive charging device has a voltage source and an oscillating circuit, connected thereto, with a charging coil and a capacitance. The voltage source has in particular a transformer or inverter, which can be connected in particular to a terminal at a supply network. The capacitance has a main capacitor and an adjustment branch connected in parallel therewith. The adjustment branch has a plurality of states, wherein each of the states is produced by means of an appropriate setting of the adjustment branch. In different states, the resulting capacitance of the adjustment branch is different and therefore also that of the oscillating circuit. In other words, in each state the capacitance connected in parallel with the main capacitor is different, and therefore the resulting capacitance of the oscillating circuit is different. It is thus possible to alter the capacitance of the oscillating circuit by adjusting the adjustment branch. In other words, in each different state of the adjustment branch, the oscillating circuit has a different capacitance and therefore also a different natural frequency. In addition, the capacitance preferably has one or more secondary capacitors, which are electrically connected in series with the main capacitor, and which in particular are not bypassed with the adjustment branch.

The inductive charging device is operated in accordance with a method in which, for different states of the adjustment branch which differ on the basis of the capacitance of the adjustment branch, a value that denotes an electrical current resulting from the charging coil is recorded. That state in which the electrical current corresponding to the value is at a maximum is determined. In addition, the adjustment branch is set to correspond to the state.

In particular, the charging device has a control device by means of which the method is at least partially carried out. In other words, the control device is suitable, in particular provided and designed, for carrying out the method. The control device is created by means of discrete components, for example, or the control device has a microcontroller, for example, which is expediently configured to be programmable.

For example, the adjustment branch has an adjustable capacitor that can be actuated electrically in particular.

Particularly preferably, however, the adjustment branch has an adjustment path with an auxiliary capacitor and a switching element electrically connected in series therewith. The switching element is in particular an electrical switch, such as a transistor or a MOSFET. Alternatively, the switching element is a thyristor, for example, which means that energy requirements are reduced. By adjusting the switching element, at least two of the states are defined. In other words, the switching state of the switching element is different in at least two of the states. If the switching element is electrically conductive, the auxiliary capacitor is electrically connected in parallel with the main capacitor, so that the capacitance of the oscillating circuit is increased. In contrast, however, if the switching element is open, that is to say is in the electrically non-conductive state, the capacitance of the oscillating circuit is not increased, and predefined only by means of the main capacitor and any secondary capacitors, for example. It is therefore possible, by activating the switching element, to switch through at least two of the states of the adjustment branch and also to set the adjustment branch correspondingly, and expediently no manual action is required for this. Convenience is therefore increased, and it is also possible to carry out the method in a substantially automated manner.

For example, the adjustment branch is formed by means of the adjustment path. Particularly preferably, however, the adjustment branch has a plurality of such adjustment paths which are electrically connected in parallel with one another. The states, in particular, are defined by means of the switching states of the switching elements. For example, all the auxiliary capacitors are structurally identical. Particularly preferably, however, they differ from one another, and therefore the number of different states is increased. In particular, the or each adjustment path is connected in parallel with the main capacitor. For example, the adjustment branch comprises 3, 4, 5, or more such adjustment paths. The number of adjustment branches is expediently lower than 10. The number of adjustment branches is preferably equal to 2. The number of necessary structural elements and the necessary space is therefore comparatively small, which means that production costs are reduced.

Therefore, as long as two adjustment paths are present, the auxiliary capacitors of which are different than one another, overall four states are present. On the basis of the four different states, it is possible to alter the capacitance of the oscillating circuit comparatively extensively, so that its natural frequency can be matched to the desired value, that is to say in particular the frequency of the alternating voltage provided by means of the voltage source.

For example, the charging device comprises a current sensor for recording the value, for example a Hall sensor that is arranged in the region of the charging coil. Particularly preferably, however, the inductive charging device comprises a voltage sensor for recording the value. In other words, the value is an electrical voltage, specifically preferably an electrical voltage across a measurement resistor. In particular, the measurement resistor is electrically connected in parallel with any of the secondary capacitors. The measurement resistor is electrically connected in series with a diode connected to the oscillating circuit. Therefore, only a half-wave of the respective electrical voltage/the electrical current is transferred via the diode. Rectification therefore takes place by means of the diode, which means that only one polarity of the electrical voltage is processed further, hence construction of the voltage sensor is simplified. Production costs are therefore reduced further. In summary, the voltage sensor is present in order to record the value, specifically to measure the electrical voltage across the measurement resistor, and is electrically connected in series with the diode connected to the oscillating circuit. The measurement resistor is in particular an ohmic resistor, or for example a component part of a shunt.

For example, only the voltage sensor, the measurement resistor and the diode are present. Particularly preferably, however, a measurement capacitor is connected in parallel with the measurement resistor. This measurement capacitor is used to smooth the electrical voltage across the measurement resistor. Consequently, no fluctuations or only reduced fluctuations occur in the value, and therefore the further processing, in particular the determining of the maximum, is facilitated.

For example, the diode is connected directly to the oscillating circuit. Particularly preferably, however, the diode is connected to the oscillating circuit via a voltage divider. Therefore, only a comparatively low electrical voltage occurs across the measurement resistor, thus reducing loading of the components. Inexpensive components can therefore be used. Fluctuations are also reduced in components configured for only a low load, which increases accuracy. In particular, the voltage divider is electrically connected in parallel with one of any secondary capacitors.

The system has a hearing instrument and an inductive charging device. The hearing instrument is a headset or a headphone, for example. Particularly preferably, the hearing instrument is a hearing aid and is used to support a person suffering at least partially from hearing loss. Alternatively, the hearing instrument is used in particular as a so-called tinnitus masker, that is to say in particular for treating tinnitus. For example, the hearing aid is a “receiver-in-the-canal” hearing aid (RIC; Ex receiver hearing aid), an “in-the-ear” hearing aid, an “in-the-canal” hearing aid (ITC) or a “complete-in-canal” hearing aid (CIC), hearing glasses, a pocket hearing aid, a bone conduction hearing aid or an implant. Alternatively, the hearing aid is a “behind-the-ear” hearing aid, which is worn behind the auricle.

The hearing instrument preferably has a battery by means of which, during operation, powering of further components of the hearing instrument takes place in particular. The battery is preferably a secondary battery and in a suitable manner is permanently installed, that is to say in particular non-removably, in a housing of the hearing instrument. In addition, the hearing instrument suitably has a charging unit which is used to charge the hearing instrument, in particular the battery. The charging unit is suitable, in particular provided and designed, for this purpose. The charging unit is particularly suitable, expediently provided and designed, for wireless charging. The charging unit is suitably arranged inside the housing of the hearing instrument. The charging unit preferably has a receiving coil, and is electrically contacted with the battery, for example, preferably directly.

The charging device comprises a voltage source and an oscillating circuit, connected thereto, with a charging coil and an (electric) capacitance that has a main capacitor and an adjustment branch connected in parallel therewith. The charging device is operated in accordance with a method in which, for different states of the adjustment branch which differ from one another on the basis of the capacitance of the adjustment branch, a value that denotes an electrical current resulting from the charging coil is recorded. That state in which the electrical current corresponding to the value is at a maximum is determined, and the adjustment branch is set to correspond to the state.

In particular, it is possible to inductively couple the hearing instrument and the inductive charging device. For example, the charging device has a holder for at least temporarily securing the hearing instrument, preferably during a charging process.

The developments and advantages explained in connection with the method are also to be applied analogously to the method/the hearing instrument together and vice versa.

An exemplary embodiment of the invention will now be explained in more detail hereinbelow with reference to the accompanying drawings. In the drawings:

BRIEF DESCRIPTION OF THE FIGURES

Mutually corresponding parts are provided with the same reference signs in all the figures.

DETAILED DESCRIPTION OF THE INVENTION

Figure 1:
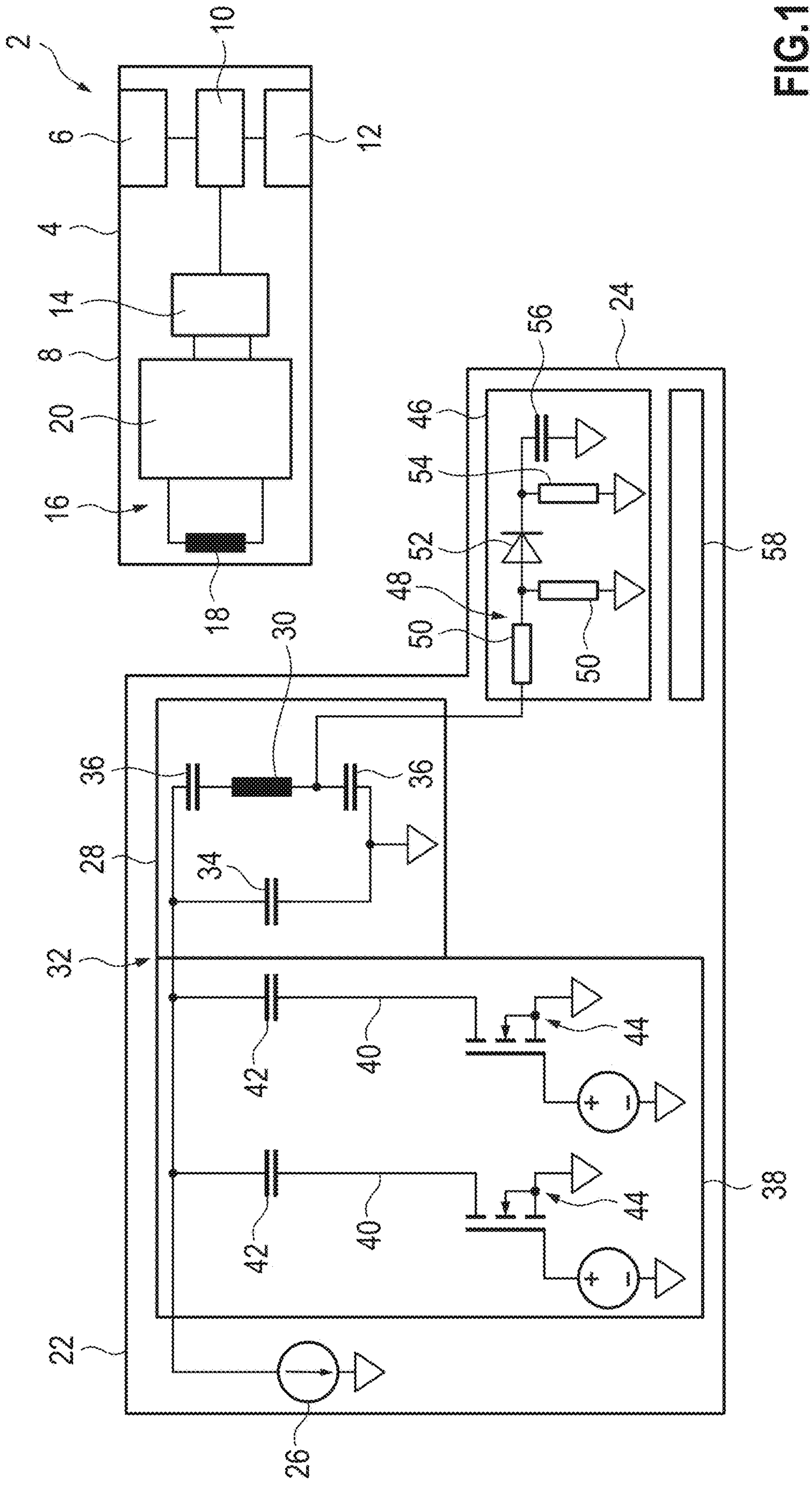
FIG. 1 shows a schematic simplified circuit diagram of a system having a hearing instrument and an inductive charging device.

A simplified circuit diagram of a system 2 that comprises a hearing instrument 4 is depicted schematically in FIG. 1. The hearing instrument 4 is a hearing aid and is used to support a user, not depicted in more detail, with at least partial hearing loss. For this purpose, the hearing instrument 4 has a microphone 6 that is acoustically coupled to an opening, not depicted in more detail, of a hearing-aid housing 8. A signal processing unit 10, which has a digital signal processor (DSP) that is not depicted in more detail, is connected to the microphone 6 in 14 terms of signal technology. By means of the signal processing unit 10, during operation, the electrical signals provided by means of the microphone 6 are suitably processed so as to compensate for the hearing loss of the user and to filter out any noise. A receiver 12 is connected to the signal processing unit 10 in terms of signal technology, which receiver 12 is acoustically connected to a further opening of the hearing-aid housing 8. Via this further opening, sound waves generated by means of the receiver 12 are directed out of the hearing-aid housing 8. In the intended state of the hearing instrument 4, the hearing-aid housing 8 is guided into an auditory canal of the user, wherein the opening of the hearing-aid housing 8 to which the microphone 6 is acoustically coupled is situated on a side that faces away from the eardrum, and the opening assigned to the receiver 12 is situated on a side of the hearing-aid housing 8 that faces the eardrum.

To power the signal processing unit 10, by means of which the microphone 6 and the receiver 12 are also operated, the hearing instrument 4 has a battery 14 permanently installed in the hearing-aid housing 8. The hearing instrument 4 comprises a charging unit 16, which is also arranged in the hearing-aid housing 8 and has a receiving coil 18 which is electrically contacted with a further unit 20 of the charging unit 16. By means of the further unit 20, a rectifier and a charge controller are provided, and these are electrically contacted with the battery 14. It is therefore possible to charge the battery 14 inductively, and therefore with the exception of openings provided for the microphone 6 and the receiver 12, no further openings are required in the housing 8. The impermeability of the hearing instrument 4 is therefore comparatively high.

To charge the hearing instrument 4, the system 2 comprises an inductive charging device 22, which is also simply referred to as a charging device. The charging device 22 has a housing 24 in which a voltage source 26 is arranged. An electrical alternating voltage of 12 V, for example, is provided by means of the voltage source 26 during operation. For this purpose, the voltage source 26 comprises a transformer, not depicted in more detail, which is connectable to an alternating current network as a supply network via a plug which is not depicted in more detail. With the exception of the plug, the housing 24 is configured to be continuous all the way around, and therefore it is also comparatively impermeable.

An oscillating circuit 28 is connected to the voltage source 26, which oscillating circuit 28 is electrically connected in parallel with the voltage source 26. The oscillating circuit 28 has a charging coil 30, which is an electric coil. The inductance of the charging coil 30 is 96.4 nH in the depicted example. The oscillating circuit 28 furthermore comprises a capacitance 32, which is electrically connected in series with the charging coil 30. This is used to determine a natural frequency of the oscillating circuit 28. When the voltage source 26 is operated, the oscillating circuit 28 is stimulated to oscillate, wherein the frequency of the flowing electrical current is predefined on the basis of the applied alternating voltage. The closer the two frequencies match, the greater the electrical current fed by means of the oscillating circuit 28 and thus also the stronger the temporally variable magnetic field created by means of the charging coil 30.

The capacitance 32 has a main capacitor 34, the capacitance of which is 6.6 nF. Two secondary capacitors 36 are electrically connected in series with the main capacitor 34, one of which has a capacitance of 4.8 nF and the other of which has a capacitance of 2.8 nF. If the charging coil 30 and the capacitors 34, 36 were to have no manufacturing tolerances, the resonant frequency of the oscillating circuit 28 would be in particular 13.556 MHz. Owing to manufacturing tolerances in these components, however, it is possible that the natural frequency of the oscillating circuit 28 is shifted. An adjustment branch 38 is therefore electrically connected in parallel with the main capacitor 28, which adjustment branch 38 has two adjustment paths 40 which are electrically connected in parallel with one another. Each of the adjustment paths 40 is connected in parallel with the main capacitor 34.

Each adjustment path 40 has an auxiliary capacitor 42, which is electrically connected in series with a switching element 44. The capacitance of the two auxiliary capacitors 42 is different and is 0.47 nF for one and 1.5 nF for the other. The two switching elements 44, in contrast, are structurally identical and are each formed by means of a MOSFET which is operated with a suitable drive circuit.

Furthermore, the charging device 22 has a measurement circuit 46, which is connected in parallel with one of the secondary capacitors 36, specifically the one with a capacitance of 2.8 nF. The measurement circuit 46 has a voltage divider 48 with two resistors 65 which are electrically connected in series. The voltage divider 48 is connected in parallel with the corresponding secondary capacitor 46, and one of the resistors 50 is bypassed with a series circuit consisting of a diode 52 and a measurement resistor 54. The measurement resistor 54 is therefore electrically connected in series with the diode 52 connected to the oscillating circuit 28, wherein the diode 52 is connected to the oscillating circuit 28 via the voltage divider 48. A measurement capacitor 56 is connected in parallel with the measurement resistor 54.

The measurement circuit 46 furthermore has a voltage sensor, not depicted in more detail, for measuring an electrical voltage across the measurement resistor 54. Owing to the diode 52, the electrical voltage across the measurement resistor 54 has only a single polarity, and the electrical voltage is additionally smoothed by means of the measurement capacitor 56, and therefore the electrical voltage occurring is substantially a direct voltage, although an alternating voltage is fed by means of the oscillating circuit 28 during operation.

Figure 2:
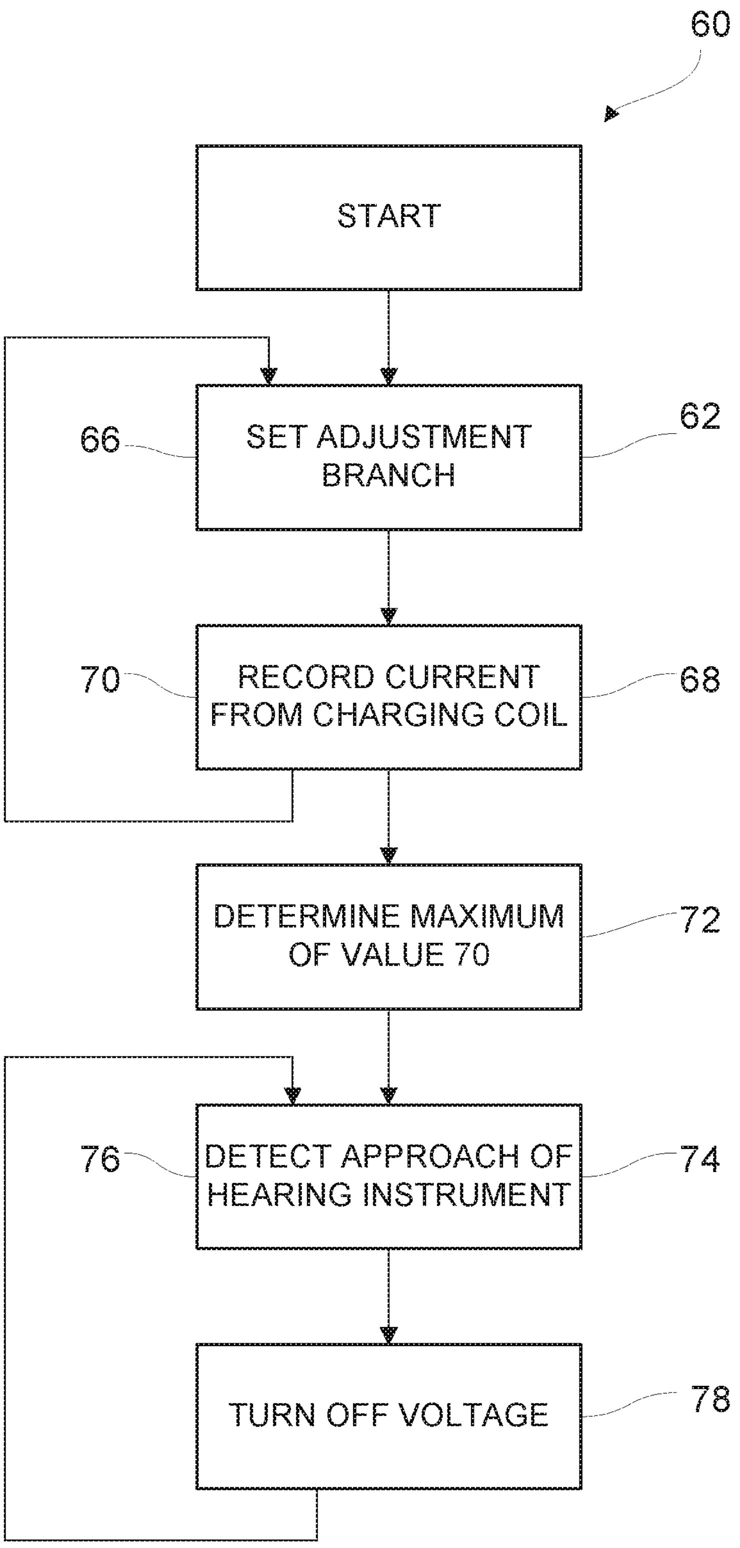
FIG. 2 shows a method for operating an inductive charging device.

Furthermore, the charging device 22 has a control device 58 by means of which the voltage source 26 and the switching elements 44 are controlled and the voltage sensor is read out. By means of the control device 58, a method 60 depicted in FIG. 2 is at least partially carried out to operate the inductive charging device 22. In other words, the charging device 22 is operated in accordance with the method 60, and the control device 58 is provided and designed to carry out the method 60.

The method 60 is started in a first work step 62. The first work step 62 is carried out after completion of manufacture of the charging device 22, that is to say when it has been mechanically assembled but not yet used. Therefore, this part of the method 60 is carried out in particular in a factory, or at a dealership for example.

In a subsequent second work step 64, the adjustment branch 38 is set to correspond to one of four predefined states 66. In this state 66, the two switching elements 44 are open, and therefore the adjustment paths 40 are electrically separated. The size of the capacitances of the auxiliary capacitors 42 therefore does not contribute to the size of the capacitance 32 of the oscillating circuit 28. Furthermore, the voltage source 26 is operated and thus energizes the oscillating circuit 28. As a consequence, an electrical current flows through the charging coil 30.

In a subsequent third work step 68, a value 70 is recorded which denotes the current resulting from the charging coil 30. The electrical voltage across the measurement resistor 54 is used as the characteristic value 70, which electrical voltage is additionally smoothed by means of the measurement capacitor 56. Owing to the rectification by means of the diode 52, the value 70 is only positive. In this example, therefore, the greater the electrical current fed by means of the charging coil 30, the greater the value 70.

The value 70 is stored and the second work step 64 is then carried out again, but a different state 66 of the adjustment branch 38 is selected here. In this, one of the two switching elements 44 is closed, and therefore the auxiliary capacitor 42 assigned to this adjustment path 40 contributes to the size of the capacitance 32 of the oscillating circuit 28. As a consequence, the natural frequency of the oscillating circuit 28 is altered in comparison with the preceding performance of the second work step, with the result that the size of the electrical current fed by means of the charging coil 30 is altered. As a consequence, the value 70 recorded in the subsequently performed third work step 68 is altered. This too is stored.

Following this, the second work step 64 is carried out again, with an altered state 66 of the adjustment path 40 again being used. In this, the other switching element 44 is now electrically conductive, and the previously electrically conductive switching element 44 is put into the electrically non-conductive state. For this state 66 as well, the value 70 is recorded and stored in the subsequently performed third work step 68.

The second work step 64 is subsequently carried out one last time, wherein the now-present state 66 corresponds to a setting of the adjustment branch 38 in which both switching elements 44 are closed, that is to say electrically conductive. The value 70 is recorded and stored again.

In the different performances of the second and third work steps 64, 68, the size of the capacitance 32 was different, the natural frequency of the oscillating circuit 28 was different in each case. The electrical current fed by means of the charging coil 30 was therefore different in each case, even when the voltage source 26 is always operated in the same manner. The smaller the deviation between the natural frequency of the oscillating circuit 28 and the frequency of the alternating voltage provided by means of the voltage source 26, the greater the electrical current. As a consequence, all the recorded values 70 also differ from one another. In summary, in the second and third work steps 64, 68, the value 70 that denotes the electrical current resulting from the charging coil 30 is therefore recorded for the four different states 66 of the adjustment branch 38, which differ on the basis of the capacitance of the adjustment branch 38. For two of the states 66 in each case, the switching state of one of the two switching elements 44 is different in each case. In a variant, not depicted in more detail, the adjustment branch 38 has more corresponding adjustment paths 40, and therefore the number of states 66 is also increased. Consequently, the second and third work steps 64, 68 are performed more often.

As soon as the value 70 has been recorded for all the states 66, a fourth work step 72 is carried out. In this step the maximum of the recorded values 70 is determined, that is to say the value 70 at which the corresponding electrical current was at a maximum. Subsequently, it is determined which one of the states 66 corresponds to this value 70. In other words, the state 66 in which the value 70 is at a maximum is determined. Consequently, that state 66 in which the natural frequency of the oscillating circuit 28 is closest to the frequency of the electrical voltage provided by means of the voltage source is determined.

The adjustment branch 38 is set to correspond to this state 66, that is to say the switching state of the two switching elements 44 is selected accordingly. For this purpose, in particular the corresponding switching state of the two switching elements 44 is stored in a memory of the control device 58, so that when the charging device 22 is started up again, the corresponding activation of the switching elements 44 can take place substantially immediately. The control device 58 is constructed in such a way that, when the corresponding memory is written to, the switching elements 44 can only be activated in accordance with this setting when the charging device 22 is powered. Subsequently, the part of the method 60 in which setting of the charging device 22 takes place is terminated.

In a subsequent fifth work step 74, a movement of the hearing instrument 4 close to the charging device 22 is detected by means of a sensor or the like, which is not depicted in more detail. In this case, a charging process 76 is started. For this purpose, the oscillating circuit 28 is energized by means of the voltage source 26, such that a temporally variable magnetic field is created by means of the charging coil 30. As a consequence, an electrical alternating current is induced in the receiving coil 28 situated nearby, which electrical alternating current is processed further by means of the further unit 20, so that the battery is charged.

When the battery 14 is sufficiently charged, or the hearing instrument 4 is removed from the charging device 22, a sixth work step 78 is carried out, and the voltage source 26 is shut down. The charging process 76 is thus terminated. As soon as the hearing instrument 4 is moved close to the charging device 22 again or the battery 14 is at least partially discharged, the fifth work step 74 is carried out again. Thus in the method 60, that state 66 in which the value 70 is at a maximum is determined only once, and the adjustment path 40 is set accordingly. In contrast, a plurality of charging processes 76 are carried out in the method 60.

The invention is not limited to the above-described exemplary embodiment. Rather, other variants of the invention can also be derived therefrom by a person skilled in the art, without departing from the subject matter of the invention. In particular, all the individual features described in connection with the exemplary embodiment furthermore can also be combined with one another in another way, without departing from the subject matter of the invention.

LIST OF REFERENCE SIGNS

2 system
4 hearing instrument
6 microphone
8 hearing-aid housing
10 signal processing unit
12 receiver
14 battery
16 charging unit
18 receiving coil
20 further unit
22 inductive charging device
24 housing
26 voltage source
28 oscillating circuit
30 charging coil
32 capacitance
34 main capacitor
36 secondary capacitor
38 adjustment branch
40 adjustment path
42 auxiliary capacitor
44 switching element
46 measurement circuit
48 voltage divider
50 resistor
52 diode
54 measurement resistor
56 measurement capacitor
58 control device
60 method
62 first work step
64 second work step
66 state
68 third work step
70 value
72 fourth work step
74 fifth work step
76 charging process
78 sixth work step

The invention claimed is:

1. A method for operating an inductive charging device of a hearing instrument, the method comprising:

providing the inductive charging device with a voltage source and an oscillating circuit connected to the voltage source, with a charging coil and a capacitance, the capacitance having a main capacitor and an adjustment branch connected in parallel with said main capacitor;

for different states of the adjustment branch that differ from one another based on the capacitance of the adjustment branch, recording a value that denotes an electrical current resulting from the charging coil;

determining a given state in which the electrical current corresponding to the value is at a maximum; and setting the adjustment branch to correspond to the given state.

2. The method according to claim 1, which comprises, after the setting step, starting a charging process of the hearing instrument.

3. An inductive charging device, comprising:

a voltage source and an oscillating circuit connected to said voltage source;

said oscillating circuit having a charging coil and a capacitance with a main capacitor and an adjustment branch connected in parallel with said main capacitor; and wherein the inductive charging device is configured to be operated in accordance with the method according to claim 1.

4. The inductive charging device according to claim 3, wherein:

said adjustment branch has an adjustment path with an auxiliary capacitor and a switching element electrically connected in series therewith, and wherein a switching state of said switching element is different in at least two of the states.

5. The inductive charging device according to claim 4, wherein said adjustment path of said adjustment branch is one of a plurality of adjustment paths electrically connected in parallel with one another.

6. The inductive charging device according to claim 3, which comprises a voltage sensor for recording the value, said voltage sensor being electrically connected in series with a diode connected to said oscillating circuit.

7. The inductive charging device according to claim 6, wherein said sensor is configured for measuring an electrical voltage across a measurement resistor.

8. The inductive charging device according to claim 7, wherein a measurement capacitor is connected in parallel with said measurement resistor.

9. The inductive charging device according to claim 6, which comprises a voltage divider connecting said diode to said oscillating circuit.

10. A system, comprising:

a hearing instrument; and an inductive charging device configured for operation in accordance with the method according to claim 1 and for charging said hearing instrument, said inductive charging device having:

a voltage source and an oscillating circuit connected to said voltage source; and said oscillating circuit having a charging coil and a capacitance with a main capacitor and an adjustment branch connected in parallel with said main capacitor.

* * * * *